J. C. LIGHTHOUSE.
WHEEL.
APPLICATION FILED MAY 7, 1907.
969,887.
Patented Sept. 13, 1910.
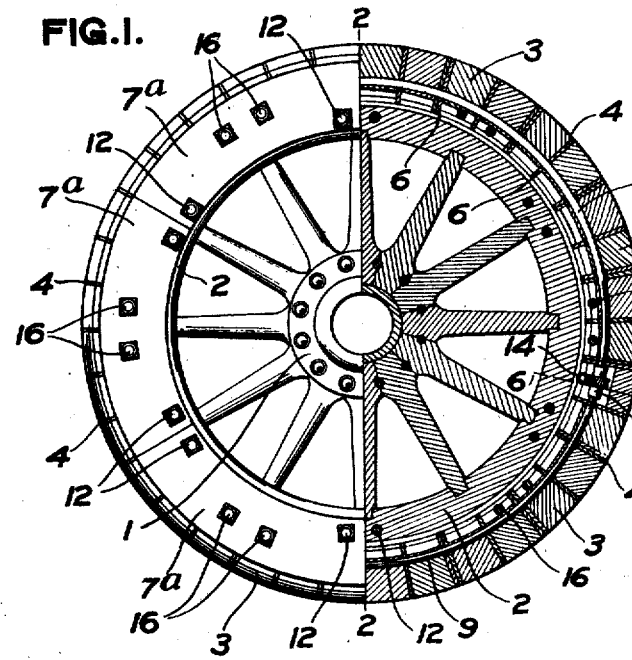
FIG.1.
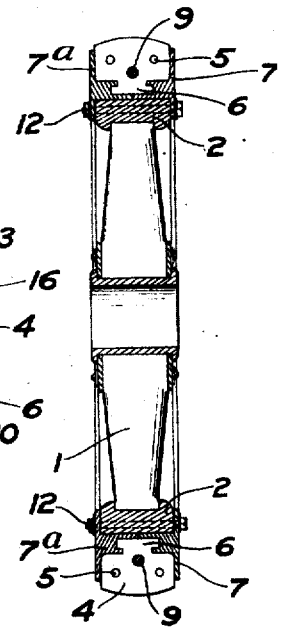
FIG.2.
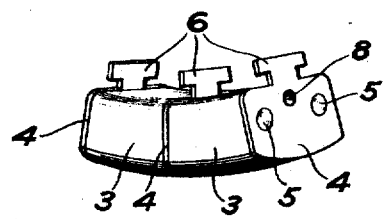
FIG.5.
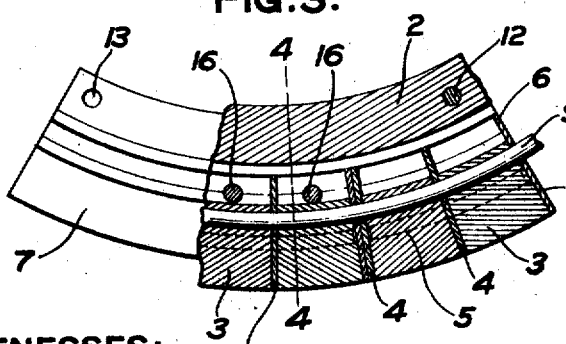
FIG.6.
FIG.3.
FIG.4.
WITNESSES:
Clarence W. Carroll
L. Thon
INVENTOR:
John C. Lighthouse
by Osgood Mains
his Attys

UNITED STATES PATENT OFFICE.

JOHN C. LIGHTHOUSE, OF ROCHESTER, NEW YORK.

WHEEL.

969,887.

Specification of Letters Patent.   Patented Sept. 13, 1910.

Application filed May 7, 1907.   Serial No. 372,447.

*To all whom it may concern:*

Be it known that I, JOHN C. LIGHTHOUSE, a citizen of the United States and resident of Rochester, in the county of Monroe and State of New York, have invented certain new and useful Improvements in Wheels, of which the following is a specification.

The object of this invention is to produce a wheel having a resilient tire comprising a number of removable and interchangeable sections, in which the sections shall be firmly and securely held in place, but in which the sections may be readily and conveniently released when necessary for their removal.

To this end the invention consists in the wheel hereinafter described, as the same is defined in the succeeding claims.

In the accompanying drawings, which illustrate the preferred embodiment of my invention, Figure 1 is a side elevation, partly in section, of the complete wheel; Fig. 2 is a section on the line 2—2 of Fig. 1; Fig. 3 is a longitudinal section of a portion of the rim and tire of the wheel; Fig. 4 is a section on the line 4—4 of Fig. 3; Fig. 5 is a perspective view of one tire-section; and Fig. 6 is an enlarged section on the line 6—6 of Fig. 1, looking from beneath.

The illustrated embodiment of my invention is provided with a hub and spokes of ordinary form, and upon the spokes 1 is mounted, in the usual manner, a wooden felly or rim 2.

The tire is made of a number of short sections, each of which is provided with blocks 3 of rubber or other resilient material. These blocks are not secured directly to the felly, but are fastened to tire-block holders consisting of plates 4 of sheet metal. Two blocks are used in each section and three holders, one holder being between the two blocks and the other two holders at the outer ends of the blocks, as shown in Fig. 5. Each tire section is held together by two studs or rivets 5 which pass through the tire blocks and the holders, and are upset at the ends as shown in dotted lines in Fig. 3.

In order to secure the tire-block holders to the felly, they are provided with T-shaped heads 6. These heads are engaged by correspondingly formed portions of plates 7 and 7ª which are fixed upon the felly. A plurality of plates are used on each side of the felly, so that the tire sections at any given part of the wheel may be removed and replaced without loosening the remaining tire sections. When the several plates on each side are in position, however, they form continuous, annular slots on their inner surfaces which engage the T-heads of the tire-block holders on both sides, and thereby secure the tire sections in place.

The plates 7 and 7ª are secured in place upon the wheel by means of bolts 12 passing through the plates and the wooden felly. To support the plates against lateral strains, they are also connected by bolts 16 passing through the plates on opposite sides of the wheel and nearer to the outer edges of the plates than the bolts 12.

While the construction above described secures the tire sections against removal, it does not operate to secure them with absolute rigidity, and therefore I provide additional means for securing the tire sections, such means being adapted to prevent all looseness or rattle of the tire sections. To this end the tire sections are all perforated longitudinally, as shown at 8 in Fig. 5, and through the perforations I pass a ring-shaped fastening member 9. The ends of the member 9 are threaded right and left, and engage a nut 10 seated, as shown in Fig. 1, in a recess formed in one of the tire sections. The nut is provided with a worm wheel 11 which is engaged by a worm 14 journaled in bearings in the plates 7 and 7ª. A stem 15 with a squared end projects through the plate 7 to the side of the wheel, where it may be engaged by a suitable tool to turn the worm. Through these means the clamping member 9 may be tightened after the tire sections and the side plates have been put in place, thereby taking up all looseness between the tire sections and the plates.

What I claim is:—

1. A wheel, having a circumferentially-divided wheel rim comprising removable, oppositely-placed plates that in position form a circumferential T-shaped socket; a series of tire block holders having heads fitting in said T-shaped socket; tire blocks attached to said holders; and means for fastening said plates to the wheel for retaining said tire block holders thereon.

2. A wheel, having a circumferentially-divided wheel rim comprising removable, oppositely-placed plates that in position form a circumferential T-shaped socket; tire block holders having heads fitting in said socket, and each consisting of metallic plates forming sockets for one or more tire blocks; tire blocks fastened in said holders; and means for fastening said plates to the rim for retaining said tire block holders thereon.

3. A wheel, having a circumferentially-divided wheel rim comprising removable, oppositely-placed plates that in position form a circumferential T-shaped socket; tire block holders having heads fitting in said socket; tire blocks attached to said holders; and an annular fastening piece passing through said tire block holders and adapted to be contracted to hold the same together and to the rim.

JOHN C. LIGHTHOUSE.

Witnesses:
D. GURNEE,
C. W. CARROLL.